(12) United States Patent
Hoshizaki et al.

(10) Patent No.: US 7,957,898 B2
(45) Date of Patent: Jun. 7, 2011

(54) COMPUTATIONAL SCHEME FOR MEMS INERTIAL NAVIGATION SYSTEM

(75) Inventors: Takayuki Hoshizaki, Torrance, CA (US); Eric Tashiro, Torrance, CA (US)

(73) Assignee: Alpine Electronics, Inc, Tokyo (JP)

( * ) Notice: Subject to any disclaimer, the term of this patent is extended or adjusted under 35 U.S.C. 154(b) by 518 days.

(21) Appl. No.: 12/005,969

(22) Filed: Dec. 28, 2007

(65) Prior Publication Data

US 2009/0171585 A1    Jul. 2, 2009

(51) Int. Cl.
*G01C 21/00* (2006.01)

(52) U.S. Cl. ........ 701/214; 701/201; 701/222; 701/225; 342/357.32

(58) Field of Classification Search .................. 701/201, 701/207, 213, 214, 220, 225, 222; 342/357.01, 342/357.06, 357.14, 357.12, 357.15, 357.32
See application file for complete search history.

(56) References Cited

U.S. PATENT DOCUMENTS 6,304,671 B1 * 10/2001 Kakutani .................. 382/167

OTHER PUBLICATIONS

"Strapdown inertial navigation technology" D.H. Titterton and J.L. Weston, pp. 35-36, 42-43, 53-54, Peter Peregrinus,Ltd.
"Strapdown Analysis", Paul G. Savage, pp. 3-52-55, 4-14,16-17, 4-27-29, Strapdown Associates, Inc.

* cited by examiner

*Primary Examiner* — Gertrude Arthur Jeanglaud
(74) *Attorney, Agent, or Firm* — Muramatsu & Associates (57) ABSTRACT

A computational scheme for an INS which utilizes micro-electro mechanical systems (MEMS) sensors resolves issues of unnecessarily large computational burden and numerical instability which happen in using conventional methods using high-end inertial sensors. The first aspect is to omit computing Earth radii of curvatures that were used in a high-frequency application. The second aspect is to ignore the Earth rotation and the rotation of the local tangent plane with respect to Earth which are much smaller than noise and bias in the MEMS sensor output. The last aspect is to assume that the absolute amount of the platform pitch and roll angles is less than 90 degrees. According to the aspects noted above, the computational load will be one-fourth of the conventional method without degradation of accuracy.

7 Claims, 7 Drawing Sheets

Local Tangent Plane about a Reference Point

Earth Rotation:
0.004 deg/s (360 deg/day)

Fig. 2B

MEMS Gyro Noise and Bias: 0.1deg/s

Rotation of local tangent plane:
0.0004 deg/s (at 160 km/h)

| | | |
|---|---|---|
| (1,1) cos(p)cos(y) | (1,2) -cos(r)sin(y)+sin(r)sin(p)cos(y) | (1,3) sin(r)sin(y)+cos(r)sin(p)cos(y) |
| (2,1) cos(p)sin(y) | (2,2) cos(r)cos(y)+sin(r)sin(p)sin(y) | (2,3) -sin(r)cos(y)+cos(r)sin(p)sin(y) |
| (3,1) -sin(p) | (3,2) sin(r)cos(p) | (3,3) cos(r)cos(p) |

Tnb=
r = roll
p = pitch
y = yaw

Fig. 3B (Limited Orientation)

(1) Assume
-90 deg < Pitch <90 deg

Pitch = + 90 deg
Pitch = 0
Pitch = - 90 deg

(2) Assume
-90 deg < Roll < 90 deg

Roll = 0
Roll = - 90 deg
Roll = + 90 deg

Needs to track only (1,1),(2,1),(3,1),
and (3,2) elements of Tnb

Fig. 3C (Free Orientation)

Need to track all the nine
elements of Tnb

Comparison of Numbers of Necessary Computations

|  | Conventional Method | New Method |
|---|---|---|
| Multipliers | 80 | 23 |
| Dividers | 4 | 0 |
| Square Roots | 2 | 0 |

Fig. 8

COMPUTATIONAL SCHEME FOR MEMS INERTIAL NAVIGATION SYSTEM

FIELD OF THE INVENTION

This invention relates to a method involving a vehicle navigation system, and more particularly, to a computational scheme for the inertial navigation system (INS) which utilizes low-precision micro-electro mechanical systems (MEMS) sensors for simplifying the computational burden to compute the platform six degrees of freedom (DOF) motion.

BACKGROUND OF THE INVENTION

The INS is a widely used technology for guidance and navigation of a vehicle. The INS is composed of an inertial measurement unit (IMU) and a processor wherein an IMU houses accelerometers and gyroscopes which are inertial sensors for detecting platform motion with respect to an inertial coordinate system. An important advantage of the INS is independence from external support, i.e., it is self-contained. However, the INS cannot provide high accuracy at long ranges. This is because inertial sensors are subject to errors that tend to accumulate over time, i.e., the longer the drive time, the greater the inaccuracy.

More recent development in global positioning system (GPS) has made high accuracy vehicle navigation possible at low cost. However, since the GPS relies on GPS satellites, it is susceptible to jamming, RF (radio frequency) interference and multipath problems. Although the GPS provides accurate position and velocity over longer time periods, the GPS involves occasional large multipath errors and signal dropouts. Therefore, efforts are made to develop integrated INS/GPS navigation systems by combining the outputs of a GPS and an INS using the Kalman filter to remedy performance problems of both systems.

Inertial sensors used to be expensive and bulky, thus only used in precision application, e.g., aerospace and military navigation. For establishing an IMU package in a compact and inexpensive manner, efforts have been made to develop MEMS sensors resulting in commercialization of low-cost, small, but noisier MEMS inertial sensors. A computational scheme for an INS commonly known in the art offers an exact formula applicable to a system with high-end inertial sensors, for example, ring laser gyros, to track the platform six degrees of freedom without any conditions in the platform dynamics ([1] Titterton, D. H. and Weston, J. L., "*Strapdown Inertial Navigation Technology*", Peter Peregrinus Ltd., Stevenage, Herts., England, U. K., 1997, [2] Savage, P. G., "*Strapdown Analytics*", Strapdown Associates, Inc., Maple Plain, MN, 2000).

Because of the large amount of noise and bias, however, use of the conventional formula for a system with low-cost MEMS sensors is unnecessarily detailed and often results in numerical instability which often happens as soon as GPS signals are lost. Also, assumptions of free orientation, free speed, and free altitude made in the conventional method result in unnecessary computation for most of commercial vehicles whose pitch and roll angles are restricted within −90 to +90 degrees with low speed and altitude.

Therefore, there is a need of a new computational method for a MEMS based INS/GPS for larger stability and greater efficiency assuming larger sensor errors and restrictions in the platform dynamics.

SUMMARY OF THE INVENTION

It is, therefore, an object of the present invention to provide computational methods with light computational burden yet with guaranteed stability for a low cost INS/GPS navigation system which utilizes low cost MEMS sensors in its IMU to track the platform three-dimensional position, three-dimensional-velocity, and three-dimensional orientation assuming the representative dynamics of commercial vehicles.

One aspect of the present invention is to consider that Earth is flat when tracking the platform three-dimensional position, i.e., a local tangent plane is used. This assumption is applicable to low-speed and low-altitude vehicles, e.g., ground vehicles and vessels. This will reduce cumbersome computation of the Earth North-South radius of curvature ($R_N$) and East-West radius of curvature ($R_E$) from the INS high-frequency computation.

Conversions from latitude ($\phi$) and longitude ($\lambda$) into Northerly displacement (N) and Easterly displacement (E) are still required when integrating the INS and GPS, which can be done by using the reference Earth North-South radius of curvature ($R_{N0}$) and East-West radius of curvature ($R_{E0}$) computed only once at the reference point.

Another aspect of the present invention is to ignore the Earth rotation and the rotation of the local tangent plane with respect to Earth when computing the angular rates of the platform. This can be justified in the most of MEMS gyro applications since they are much smaller than noise and bias in MEMS gyro output.

Another aspect of the present invention is to focus on the platform dynamics with −90 (deg)<pitch<90 (deg) and −90 (deg)<roll<90 (deg), i.e., a platform without making vertical ascent/descent nor rolling over more than 90 degrees, which is natural to most of commercial vehicles including ground vehicles, vessels, and even commercial aircraft. These conditions (limited degrees of rotation) reduce the number of necessary parameters to track three-dimensional orientation.

According to the present invention, the computational load will be dramatically reduced to one-fourth of the conventional method without degradation of accuracy in using the conventional precision method as long as:

(1) MEMS sensors are used;
(2) the platform speed and altitude are low, e.g., ground vehicles and vessels and commercial aircrafts;
(3) −90 (deg)<pitch<90 (deg) and −90 (deg)<roll<90 (deg).

BRIEF DESCRIPTION OF THE DRAWINGS

FIG. 2A explains the Earth rotation and its amount, FIG. 2B explains rotation of the local tangent plane with respect to Earth, and FIG. 2C explains how the Earth rotation and the local tangent plane with respect to Earth are smaller than noise and bias in MEMS gyro output.

FIGS. 5A-5B are schematic diagrams showing the IMU and the inertial sensors incorporated in the IMU where

DETAILED DESCRIPTION OF THE PREFERRED EMBODIMENT

The present invention will be described in detail with reference to the accompanying drawings. The method and apparatus of the present invention takes advantages of the conditions featured in the platform dynamics and low-precision MEMS sensor performance. It should be noted that although a road vehicle is mainly used in the following description, the present invention can be advantageously implemented to other types of vehicles such as vessels, commercial aircrafts, etc.

To compute platform (vehicle) three-dimensional position, the conventional precision method tracks latitude $\phi$, longitude $\lambda$, and altitude h by numerically integrate their time derivatives at a high frequency. The time derivatives of latitude $\phi$ are the functions of velocity $v_N$, Earth North-South radius of curvature $R_N$, longitude $\lambda$, and altitude h, while the time derivatives of longitude $\lambda$ are the functions of velocity $v_E$, Earth East-West radius of curvature $R_E$, latitude $\phi$, and altitude h. The time derivative of h is simply $-v_D$. Note that computations of the Earth North-South radius of curvature $R_N$ and the Earth East-West radius of curvature $R_E$ take large burden.

Figures 1A, 1B:
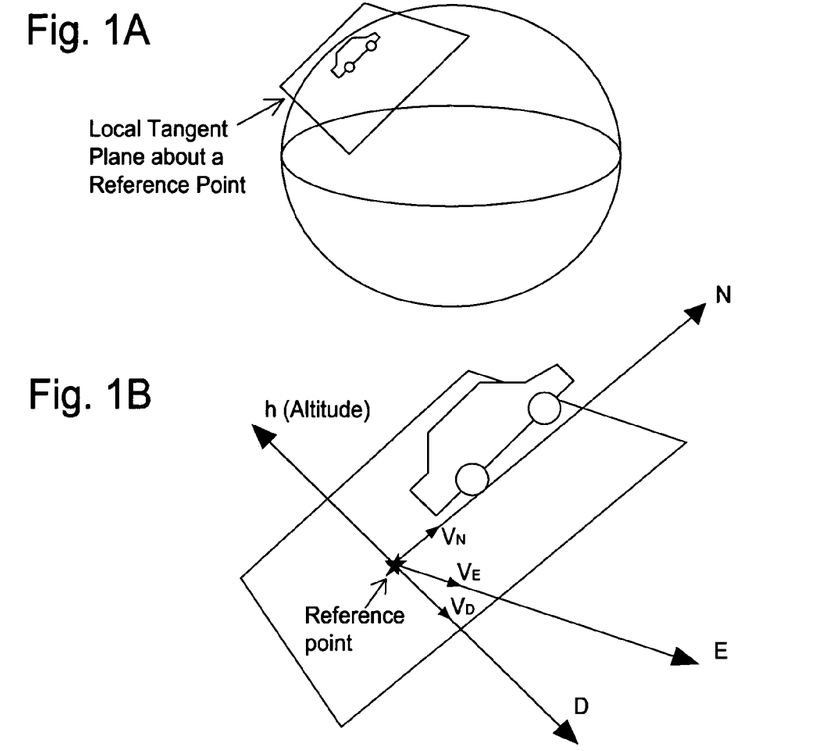
FIG. 1A depicts a local tangent plane about a reference point.
FIG. 1B depicts that N, E, and altitude (h) are obtained by numerically integrating $v_N$, $v_E$, and negative downward velocity ($-v_D$) along the local tangent plane about a reference point.

Meanwhile, FIG. 1A depicts a local tangent plane with respect to a reference point that is a concept used in an INS tracking. This concept allows to numerically track the Northerly displacement N and the Easterly displacement E by directly integrating velocities $v_N$ and $v_E$, respectively, as depicted by FIG. 1B, wherein the steps to derive the Earth radii of curvatures $R_N$ and $R_E$ requiring cumbersome computations are omitted. The computational method of the present invention gives enough accuracy in the navigation operation for low-speed and low-altitude vehicles, e.g., ground vehicles, vessels, and commercial aircrafts. In mathematical expressions, the above steps will be denoted in the following:

Position Equation in Conventional Method $$\dot{\varphi} = \frac{v_N}{R_N + h}$$

$$\dot{\lambda} = \frac{v_E}{(R_E + h)\cos\varphi}$$

$$\dot{h} = -v_D$$

Simplified Position Equation In New Method $$\dot{N} = v_N$$

$$\dot{E} = v_E$$

$$\dot{h} = -v_D$$

Note that a dot represents the time derivative in the above expressions.

Figure 1C:
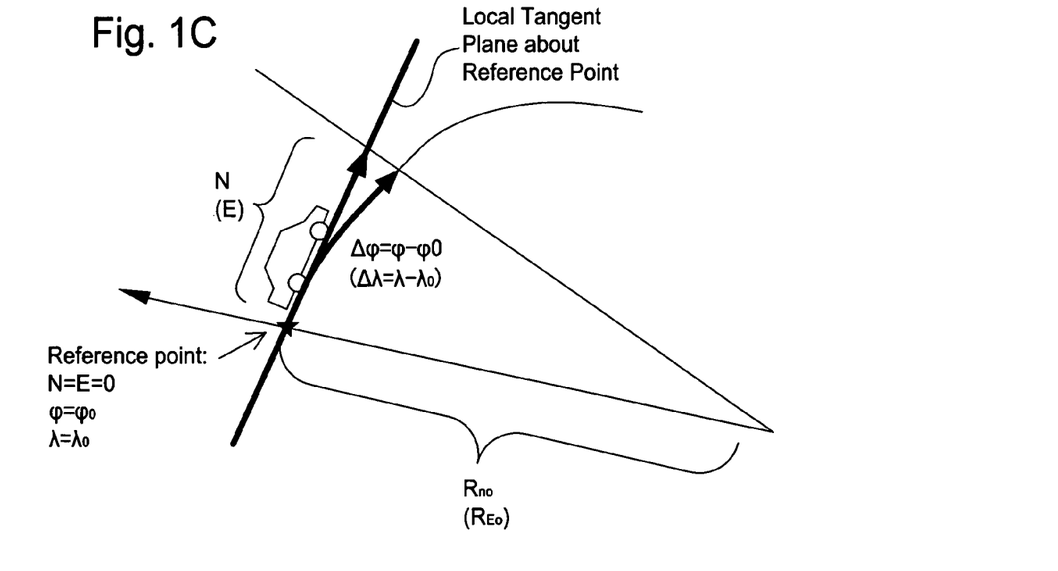
FIG. 1C depicts that when conversions of $\phi$ and $\lambda$ into N and E are required, $R_{N0}$ and $R_{E0}$ will be used.

In integrated INS/GPS navigation application, it is often necessary to compare the latitude $\phi$ and the longitude $\lambda$ possibly obtained by the GPS with the Northerly displacement N and the Easterly displacement E obtained by the INS. Although this process requires the Earth North-South radius of curvature $R_N$ and the Earth East-West radius of curvature $R_E$, this conversion can be performed by using the reference $R_{N0}$ and $R_{E0}$ which are computed only once per travel at a reference point as described in FIG. 1C.

In mathematical expressions, the above step for comparing the latitude $\phi$ and the longitude $\lambda$ with the Northerly displacement N and the Easterly displacement E will be denoted in the following:

Conversion Between $(\phi, \lambda)$ and $(N, E)$ $$N = R_{N0}(\phi - \phi_0)$$

$$E = R_{E0}(\lambda - \lambda_0)\cos(\phi)$$

Figure 2A:
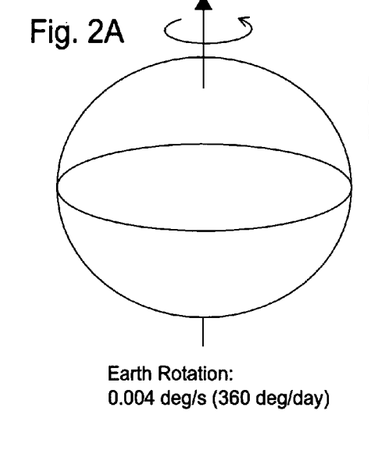
Figure 2B:
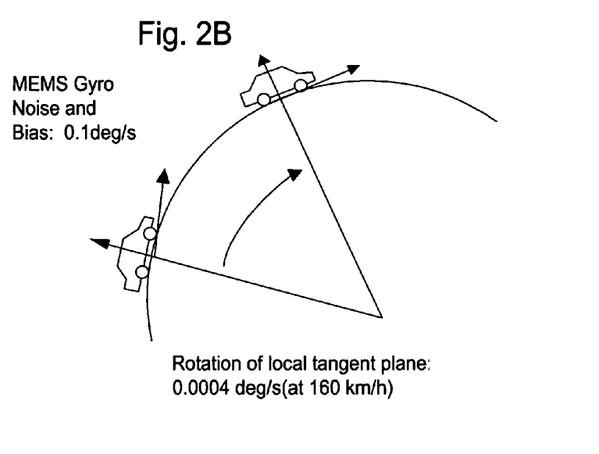
Figure 2C:
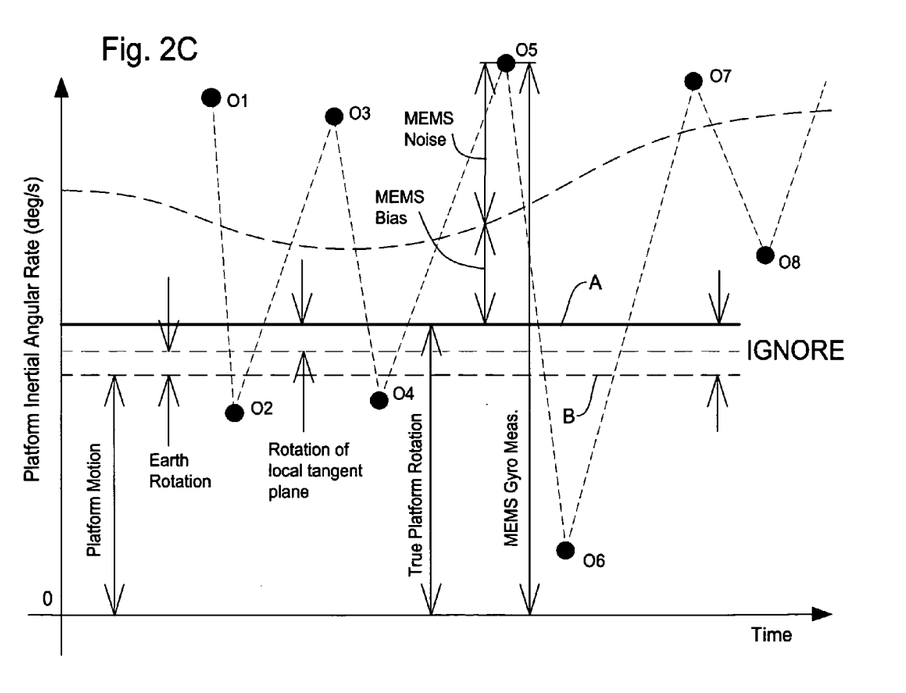

Regarding the platform rotational motion, in the conventional method, the following angular rates must be taken into consideration in navigation computation:

(1) angular rate of Earth rotation ($^i\omega^e$) (FIG. 2A)
(2) rotation of the local tangent plane with respect to Earth ($^e\omega^n$) (FIG. 2B)
(3) angular rate of the platform with respect to the local tangent plane ($^n\omega^b$)
(4) gyro output equal to the angular rate of the platform with respect to an inertial coordinate system ($^i\omega^b$) with noise and bias In the MEMS application under the present invention, however, the angular rates $^i\omega^e$ and $^e\omega^n$ are much smaller than gyro noise and bias, thus are ignorable as depicted in FIG. 2C. In the diagram of FIG. 2C, the dots O1-O8 indicate the outputs of the MEMS gyros (INS sensors shown in FIG. 7A). The Earth rotation $^i\omega^e$ is typically 0.004 deg/s as indicated in FIG. 2A, and the rotation of the local tangent plane with respect to the Earth $^e\omega^n$ is typically 0.0004 deg/s as indicated in FIG. 2B, the sum of which is within the range indicated by the lines A and B in FIG. 2C. In contrast, the MEMS gyro noise and bias is about 0.1 deg/s, respectively as indicated in FIGS. 2A-2B, thus, the MEMS sensor errors are much larger than the Earth rotation error and/or the local tangent plane rotation error as also shown in FIG. 2C. Therefore, in the present invention, the angular rates of Earth rotation $^i\omega^e$ and the angular rates of local tangent plane rotation $^e\omega^n$ are ignored in the computation process, i.e., the Earth is considered stationary. This assumption is applicable to low speed and low altitude vehicles (ground vehicles, vessels as well as small commercial aircrafts).

This assumption (angular rates of Earth rotation $^i\omega^e$=zero) further contributes to simplify the calculation process of velocity of the vehicle as follows:

Velocity Equation under Conventional Method $$\dot{v} = -(^i\omega^b + ^i\omega^e) \times v + a + g$$

Figure 3A:
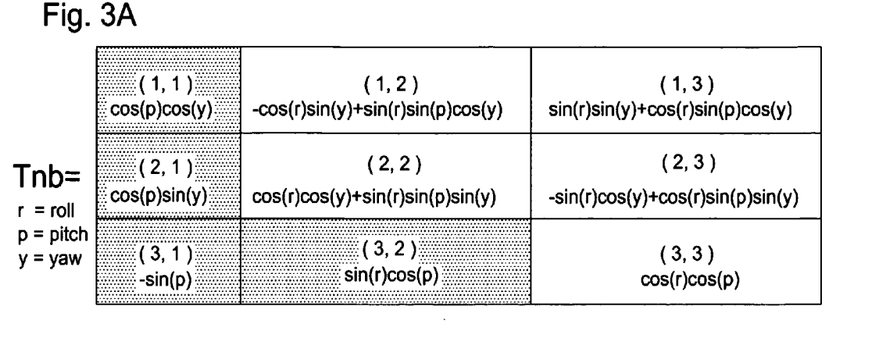
FIG. 3A depicts a three-by-three direction cosine matrix denoted as "$T_{nb}$" to track platform three-dimensional orientation, i.e, roll, pitch, and yaw angles. "$T_{nb}$" represents "Transformation from the Sensor Body coordinate system to North-East-Down, i.e. local tangent plane, coordinate system", FIG. 3B explains that only four parameters of $T_{nb}$ are necessary to track the platform of limited orientation, and a platform, and FIG. 3C explains that all the nine parameters of $T_{nb}$ are necessary to track the platform of free orientation.
Figure 3B:
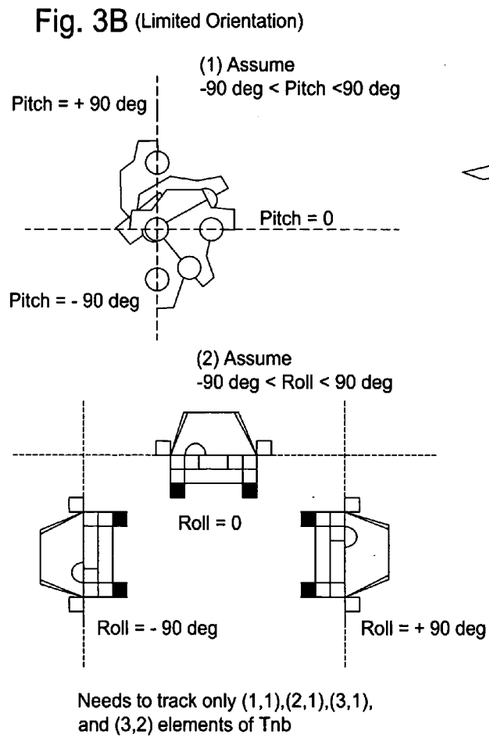
Figure 3C:
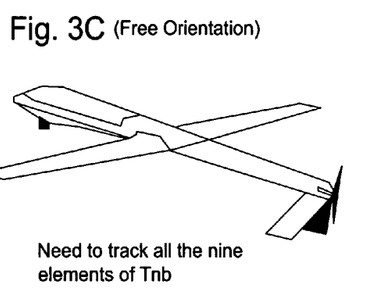

Simplified Velocity Equation under New Method $$\dot{v} = -^i\omega^b \times v + a + g$$

where
v=three-dimensional velocity vector with respect to the platform body coordinate system
a=three-dimensional accelerometer output with respect to the platform body coordinate system g=three-dimensional gravity vector with respect to the platform body coordinate system Furthermore, considering application to most of commercial vehicles, it is reasonable to assume that the platform orientation is restricted with the following conditions as depicted in FIG. 3B. In the conventional method, a three-by-three direction cosine matrix denoted as "$T_{nb}$" to track platform three-dimensional orientation, i.e, roll, pitch, and yaw angles has been incorporated as depicted in FIG. 3A. Here, "$T_{nb}$" is an orientation equation that represents "Transformation from the Sensor Body coordinate system to North-East-Down, i.e., local tangent plane, coordinate system". As noted above, the present invention limits the range of rotation of the platform as shown in FIG. 3B, which results in that only four parameters of orientation equation $T_{nb}$ are necessary to track the platform (vehicle). FIG. 3C explains that all the nine parameters (three-by-three direction cosine matrix) of orientation equation $T_{nb}$ shown in FIG. 3A are necessary to track the platform of free orientation (fighter, tactical aircraft, etc.)

Commercial Vehicle Orientation Conditions

As illustrated in FIG. 3B, in the MEMS application under the present invention, the pitch and roll of the platform are limited to the ranges as follows:

−90 (deg)<pitch<90 (deg)

−90 (deg)<roll<90 (deg)

When tracking an orientation with an INS, numerically tracking a direction cosine matrix (orientation equation) $T_{nb}$, representing a transformation from platform body to the local tangent North-East-Down coordinates system is the common method. When assuming platform free orientation, it is necessary to track all the nine elements of orientation equation $T_{nb}$ (FIG. 3A), however, under the orientation conditions described above, it is possible to reduce the number of required elements into four as indicated by the dot hatches in FIG. 3A.

Since it can recover all the other elements of orientation equation $T_{nb}$ from the sinusoidal functions of roll, pitch and yaw angles, the present invention need to track only the (1,1), (2,1), (3,1), and (3,2) elements of orientation equation $T_{nb}$ whereas the free orientation assumption in the conventional technology requires to track all the nine elements. Namely, it is possible to recover sinusoidal functions of roll, pitch, and yaw angles in the following manner (r=roll, p=pitch, y=yaw):

Direction Cosine Matrix Recovering Procedure in New Method

Step 1.

$\sin(p) = -T_{nb}(3,1)$ $\cos(p) = \text{SQRT}(1-(\sin(p))^2)$

Note that cos(p)>0 because −90 (deg)<pitch<90 (deg)

Step 2.

$\sin(r) = T_{nb}(3,2)/\cos(p)$ $\cos(r) = \text{SQRT}(1-(\sin(r))^2)$:

Note that cos(r)>0 because −90 (deg)<roll<90 (deg)

Step 3.

$\sin(y) = T_{nb}(2,1)/\cos(p)$ $\cos(y) = T^{nb}(1,1)/\cos(p)$

In mathematical expressions, the above steps for estimating an orientation of vehicle will be denoted in the following:

Orientation Equation Under Conventional Method $\dot{T}_{nb} = T_{nb} Rot(^i\omega^b - ^i\omega^e - ^e\omega^n)$ where all the nine parameters are tracked.

Simplified Orientation Equation Under New Method $\dot{T}_{nb} = T_{nb} Rot(^i\omega^b)$ where only four parameters are tracked, and where $$Rot(\omega) = \begin{bmatrix} 0 & -\omega(3) & \omega(2) \\ \omega(3) & 0 & -\omega(1) \\ -\omega(2) & \omega(1) & 0 \end{bmatrix}:$$

mapping from a vector to a skew-symmetric matrix

In a conventional INS computational method, errors accumulate on the elements of orientation equation $T_{nb}$ resulting in that self consistency of the transformation matrix breaks. Here, self consistency means that each row is orthogonal to one another (orthogonality)

the sum of squares of the elements in each rows should equal unity [0] (normality)

Therefore, it is necessary to perform orthogonalization and normalization at a certain cycle for a conventional INS. In the present invention, however, orthogonality is almost always achieved since only four elements of orientation equation are numerically integrated and the others are recovered using the exact formula as depicted in FIG. 3A. Thus, custom normalization in the following manner is performed particular to this invention:

Direction Cosine Matrix Normalization Procedure for MEMS INS

I. IF $T_{nb}(2,1)^2 + T_{nb}(3,1)^2 > 1$
   THEN $\Delta = T_{nb}(1,1)^2 + T_{nb}(2,1)^2 + T_{nb}(3,1)^2 - 1$ $$T_{nb}(1,1) = T_{nb}(1,1)\left(1 - \frac{\Delta}{2}\right)$$

$$T_{nb}(2,1) = T_{nb}(2,1)\left(1 - \frac{\Delta}{2}\right)$$

$$T_{nb}(3,1) = T_{nb}(3,1)\left(1 - \frac{\Delta}{2}\right)$$

conventional method found in [1],

II. ELSE
   $T_{nb}(1,1) = \text{sign}(T_{nb}(1,1)) \sqrt{1 - T_{nb}(2,1)^2 - T_{nb}(3,1)^2}$
   Direct normalization particular to this invention.

The mixture of the above methods I and II are preferable in the present invention.

Figure 4:
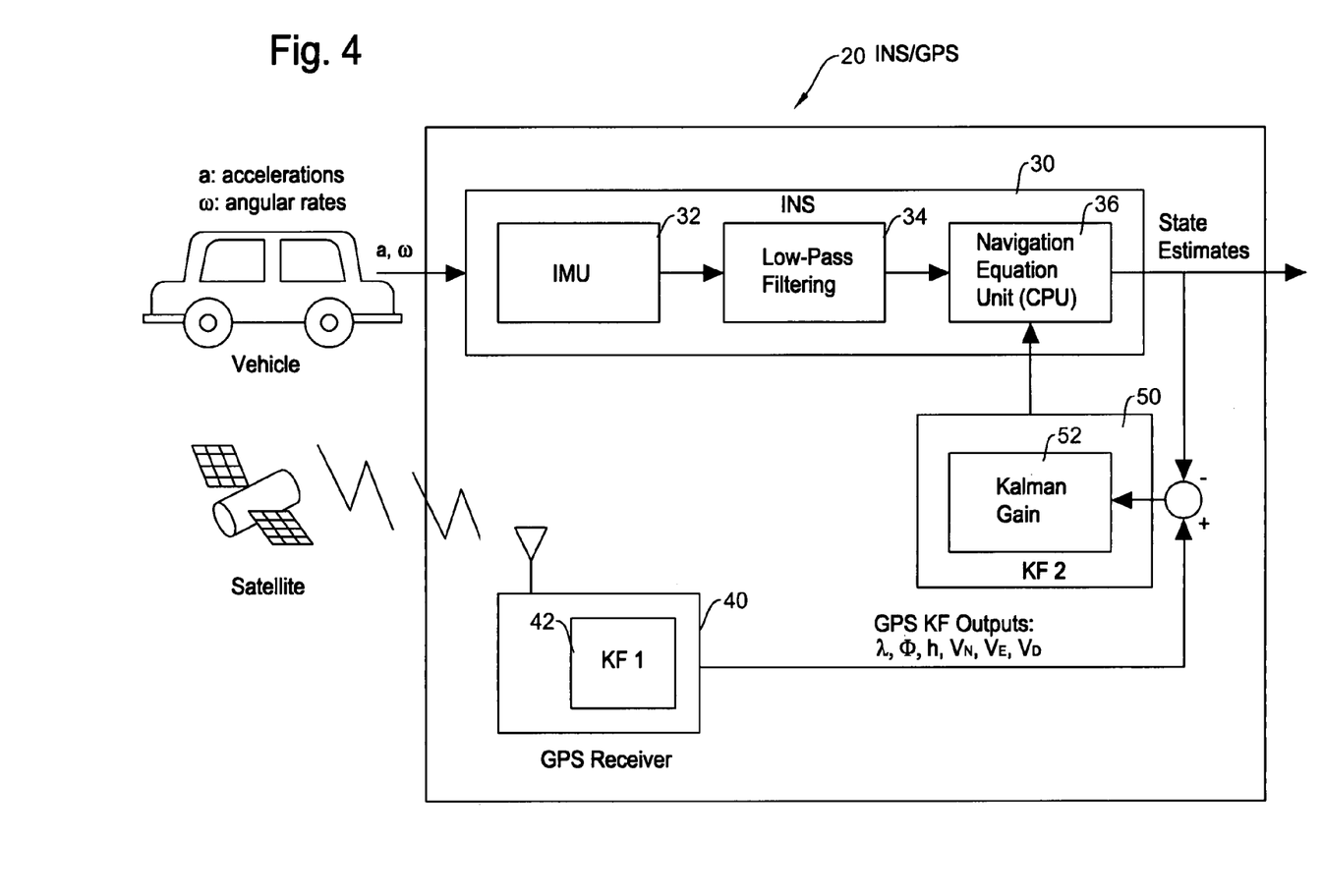
FIG. 4 is a schematic block diagram showing an example of basic configuration of the integrated INS/GPS navigation system of the present invention which is typically mounted on a ground vehicle, a vessel or a commercial aircraft.

FIG. 4 is a schematic block diagram showing an example of basic configuration of the integrated INS/GPS navigation system for implementing the computational scheme of the present invention. An INS/GPS navigation system is typically mounted on a ground vehicle, a vessel or a commercial aircraft. The INS/GPS navigation system 20 includes an inertial navigation system (INS) 30, a GPS (global positioning system) receiver 40, and a Kalman filter 50 (KF 2 or integration Kalman filter). In the example of FIG. 4, unlike ordinary GPS navigation systems widely used in automobiles today, the integrated INS/GPS navigation system 20 of the present invention does not use any speed pulse sensor to detect the moving distance of the automobile. Therefore, it is no longer necessary to establish complicated wiring in the vehicle for connecting a speed pulse sensor to a navigation system processor. Further, it is unnecessary to adjust the outputs of the speed pulse sensor which was necessary in the conventional technology because the definition of speed pulse versus distance is different from manufacturer to manufacturer of speed pulse sensors.

In FIG. 4, the INS 30 is configured by an inertial measurement unit (MU) 32, a low-pass filtering unit 34, and a navigation equation unit (CPU) 36. The GPS receiver 40 includes a Kalman filter 42 (KF 1 or GPS Kalman filter) in addition to GPS signal receiver circuits and a controller (not shown). Thus, this example shows a structure of a loosely coupled INS/GPS navigation system. As known in the art, in the case of a tightly coupled INS/GPS navigation system, GPS receiver 40 does not include a Kalman filter. The integration Kalman filter 50 (KF 2) includes a Kalman gain unit 52 which provides a gain (coefficient) to each difference between a GPS measurement and INS estimate in accordance with position tracking operations.

The IMU 32 has inertial sensors and a microprocessor. As noted above, the inertial sensors are established by MEMS (microelectro mechanical system) technologies to detect accelerations and angular rates of three coordinates of the platform (vehicle, etc). The microprocessor processes the detected signals from the inertial sensors. Because the integrated INS/GPS navigation system 20 includes inertial sensors, it can also estimate a vertical position of the vehicle with accuracy much higher than that of the ordinary GPS navigation system. The IMU 32 produces the output data, for example, 100 times per second (100 Hz). The output data from the IMU 32 is supplied to the low-pass filtering unit 34 in which high frequency components thereof are removed. The output data from the low-pass filtering unit 34 is supplied to the navigation equation unit 36 where the current position, velocity and orientation of the vehicle are estimated through the inertial navigation technology.

The GPS receiver 40 receives GPS signals from a plurality of GPS satellites and calculates the estimated location of the vehicle by comparing clock signals and position data included in the GPS signals. The GPS receiver 40 optimizes the obtained position data by the Kalman filter (KF 1) 42 to minimize the effects of noises on the satellite signals. Typically, the GPS receiver 40 produces the position and velocity data every one second (1 Hz). Each parameter of the position and velocity data produced by the GPS receiver is accompanied by accuracy information.

The estimated position data from the INS 30 and the estimated position data from the GPS receiver 40 are combined by the Kalman filter (KF 2) 50 which optimally estimates, in real time, the states of the navigation system based on such noisy measurement data. The Kalman gain unit 52 provides weight or gain to each difference between a GPS measurement and INS estimate in accordance with position tracking operations. The output of the Kalman filter 50 is provided to the navigation equation unit 36 which calculates the estimated position of the vehicle which will be displayed on a navigation monitor screen (not shown).

In this example, the navigation equation unit (CPU) 36 controls an overall operation of the INS 20 including the computational scheme of the present invention. Namely, the navigation equation unit (CPU) 36 stores the program to execute the simplified computation process of the present invention for position tracking of the vehicle. As noted above, the program is established based on the assumption that the Earth is flat when tracking the platform three-dimensional position, i.e., a local tangent plane is used, thereby simplifying the computation involving the Earth North-South radius of curvature ($R_N$) and East-West radius of curvature ($R_E$). Another condition for simplifying the computation is to ignore the Earth rotation and the rotation of the local tangent plane with respect to Earth when computing the angular rates of the platform. A further aspect of the present invention is to limit the rotation of the platform within −90 (deg)<pitch<90 (deg), and within −90 (deg)<roll<90 (deg), thereby reducing the number of necessary parameters for tracking the three-dimensional orientation of the vehicle.

Figure 5A:
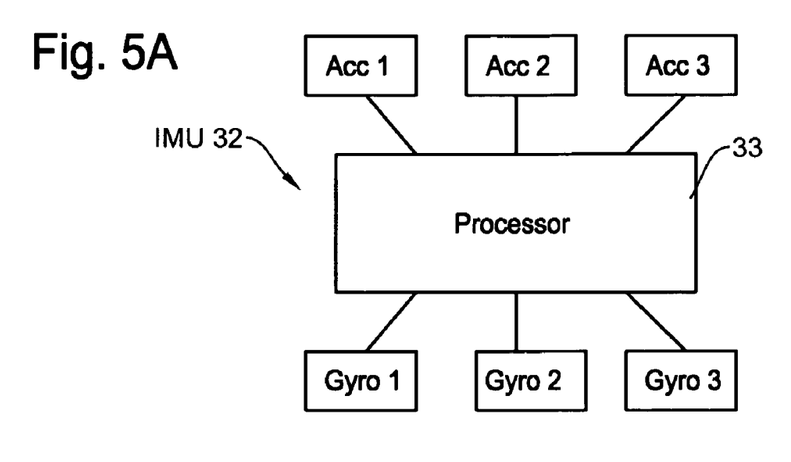
FIG. 5A is a schematic block diagram showing a basic structure of the IMU.
Figure 5B:
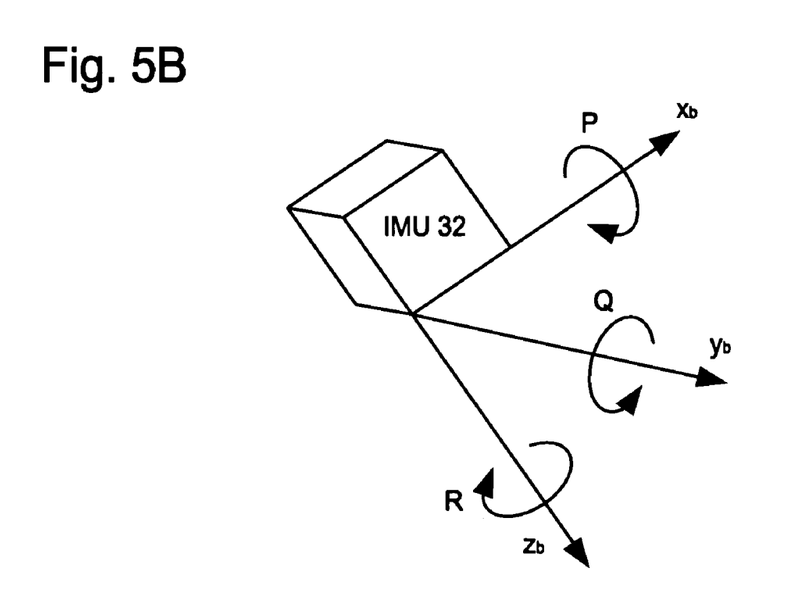
FIG. 5B is a schematic diagram depicting an IMU body coordinate system.

FIGS. 5A-5B are schematic diagrams showing the IMU 32 and the inertial sensors incorporated in the IMU 32. FIG. 5A is a schematic block diagram showing a basic structure of the IMU 32 used in the INS 30 of FIG. 4. The IMU 32 includes a processor 33, and the inertial sensors consisting of three (three-axis) accelerometers Acc 1-3 and three (three-axis) gyroscopes Gyro 1-3. The accelerometers Acc 1-3 detect accelerations in the three (X, Y, Z) coordinates of the vehicle, and the gyroscopes Gyro 1-3 detect angular rates about the three (X, Y, Z) coordinate directions of the vehicle. The processor 33 calculates the accelerations and angular rates based on the signals from the inertial sensors Acc 1-3 and Gyro 1-3. FIG. 5B is a schematic diagram depicting an IMU body coordinate system. In FIG. 5B, characters P, Q, and R represent the vehicle angular rates about the IMU coordinate components $x_b$, $y_b$, and $z_b$.

Figure 6:
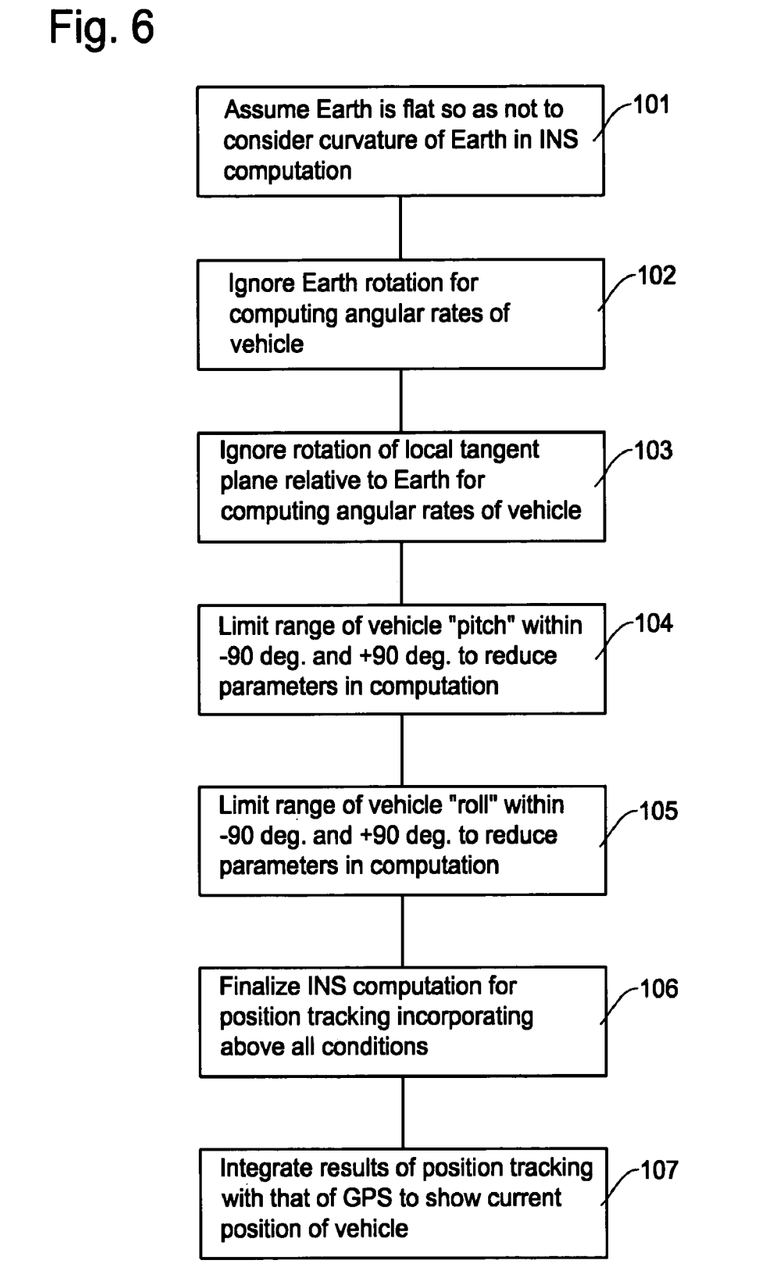
FIG. 6 is a flow chart showing an example of basic operational process for lightening the computational load for an INS in accordance with the present invention.

FIG. 6 is a flowchart showing an example of basic operational process of the INS/GPS navigation system using MEMS sensors for simplifying the computation for position tracking under the present invention. In the flowchart of FIG. 6, in the step 101, the process assumes that the Earth is flat so that it is unnecessary to incorporate the curvature of the Earth, which will simplify the computation for tracking the three-dimensional position of the vehicle. In the step 102, the process ignores the rotation of the Earth for computing the angular rates of the vehicle. Similarly in the step 103, the process ignores the rotation of the local tangent plane relative to the Earth for computing the angular rates of the vehicle. By ignoring the rotation of the Earth and the local tangent plane, the computation for tracking the three-dimensional velocity of the vehicle will be simplified.

In the step 104, the process limits the range of vehicle "pitch" within −90 degrees and +90 degrees. Similarly in the step 105, the process limits the range of vehicle "roll" within −90 degrees and +90 degrees. By limiting the degree of rotation of the vehicle, the computation for tracking the three-dimensional orientation of the vehicle will be simplified because of the dramatic reduction of the parameters involved. In the step 106, the INS finalizes the computation for tracking the vehicle incorporating all of the conditions established in the above steps 101-105. Finally, in the step 107, the results of tracking by the INS is integrated with the tracking by GPS to obtain the current position of the vehicle.

EXPERIMENTAL RESULTS

Figure 7:
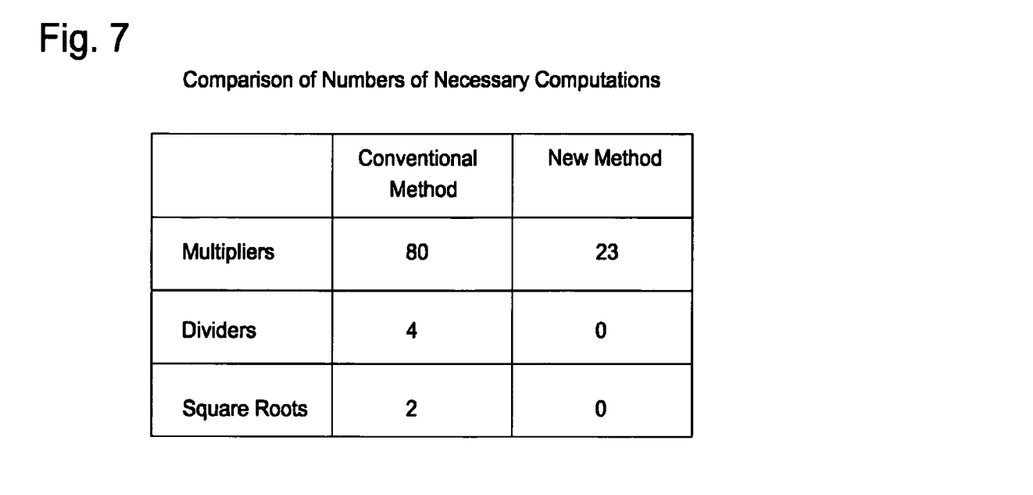
FIG. 7 summarizes the comparison of the numbers of necessary computations in one step of high-frequency INS computation between conventional method and this invention.

According to the methods proposed so far, the numbers of multipliers, dividers, and square roots reduce as described in the table of FIG. 7 resulting in the approximate amount of one-fourth of the conventional computation.

Figure 8:
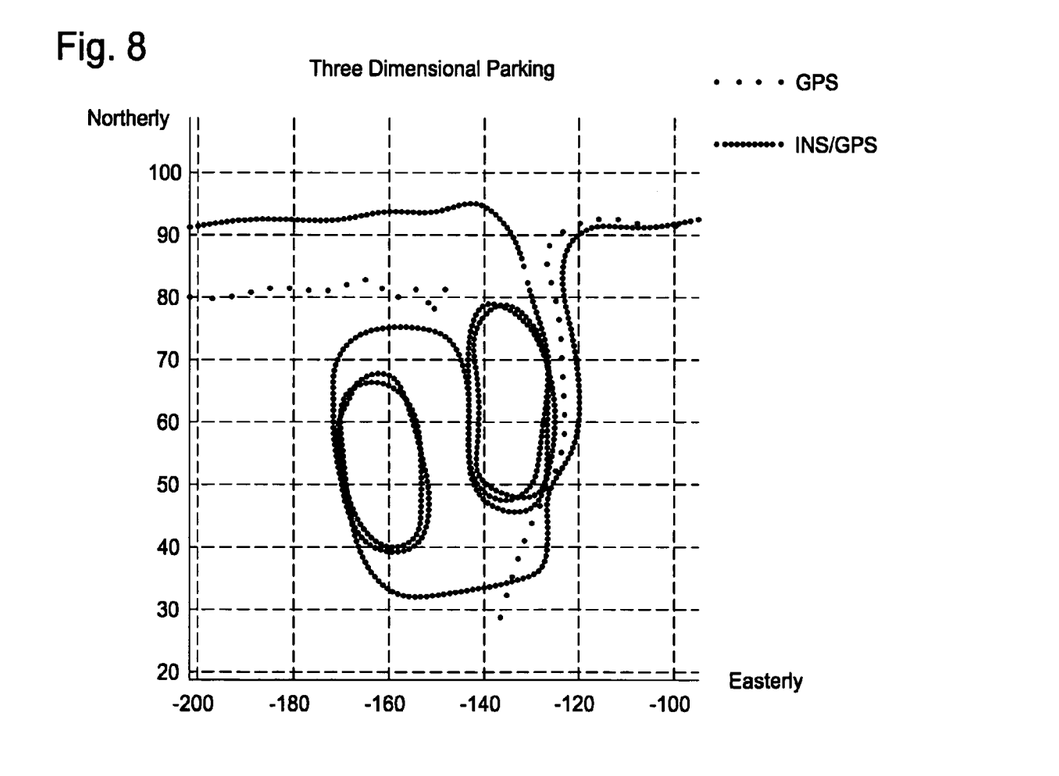
FIG. 8 shows the vehicle trajectory given by a navigation system in which a 6 DOF MEMS IMU and a GPS receiver are coupled via a Kalman filter.

FIG. 8 shows the vehicle trajectory given by the INS/GPS navigation system of FIG. 4 in which the IMU 32 and the GPS receiver 40 are coupled via the Kalman filter 50. The computation for the INS is carried out using the methods presented in this invention. It shows that the navigation system successfully tracks the vehicle motion entering and exiting a three dimensional parking building where GPS signals are dropped off for a long time inside the parking building.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A method of updating three dimensional tracking of a platform by a micro-electro mechanical systems (MEMS) based INS, comprising the following steps of:
   numerically integrating Northerly, Easterly, and downward velocities to track Northerly, Easterly, and vertical displacement from a reference point along a local tangent plane about the reference point;
   converting latitude and longitude into Northerly and Easterly displacement from the reference point using the Earth North-South and East-West curvatures computed for the reference point;
   ignoring the Earth rotation and the rotation of the local tangent plane with respect to Earth since they are much smaller than MEMS gyro noise and bias; and
   assuming the platform orientation conditions of:
   −90 (deg)<pitch<90 (deg)
   −90 (deg)<roll<90 (deg)
   to reduce the number of parameters rectuired to track in a direction cosine matrix.

2. A method of updating three dimensional tracking of a platform by a MEMS based INS as defined in claim 1, further comprising a step of recovering a direction cosine matrix from its four elements assuming the platform orientation conditions of:
   −90 (deg)<pitch<90 (deg)
   −90 (deg)<roll<90 (deg).

3. A method of updating three dimensional tracking of a platform by a MEMS based INS as defined in claim 1, further comprising a step of normalizing a direction cosine matrix periodically which is updated only from its four parameters assuming the platform orientation conditions of:
   −90 (deg)<pitch<90 (deg)
   −90 (deg)<roll<90 (deg).

4. An integrated INS/GPS navigation system implementing micro-electro mechanical systems (MEMS) sensors for tracking a vehicle, comprising:
   an inertial navigation system (INS) having an inertial measurement unit (IMU) which incorporates MEMS sensors;
   a GPS (global positioning system) receiver which receives GPS satellite signals from a plurality of GPS satellites to produce GPS measurement output indicating an absolute position and velocity of the vehicle;
   a Kalman filter which combines outputs of the INS and the GPS receiver and performs a Kalman filter processing; and
   a processor which controls an overall operation of the navigation system including a simplified computation for position tracking;
   wherein said simplified computation is conducted by assuming that Earth is flat so as not to incorporate a radius of curvature of the Earth in the computation for tracking three-dimensional positions of the vehicle.

5. The integrated INS/GPS navigation system as defined in claim 4, wherein said simplified computation is conducted by ignoring rotation of the Earth and rotation of a local tangent plane with respect to the Earth in the computation for tracking three-dimensional velocities of the vehicle.

6. The integrated INS/GPS navigation system as defined in claim 4, wherein said simplified computation is conducted by limiting a range of vehicle "pitch" within −90 degrees and +90 degrees, and limiting a range of vehicle "roll" within −90 degrees and +90 degrees in the computation for tracking the three-dimensional orientations of the vehicle.

7. The integrated INS/GPS navigation system as defined in claim 4, wherein said simplified computation is conducted by the steps of ignoring rotation of the Earth and rotation of a local tangent plane with respect to the Earth in the computation for tracking three-dimensional velocities of the vehicle, and limiting a range of vehicle "pitch" within −90 degrees and +90 degrees, and limiting a range of vehicle "roll" within −90 degrees and +90 degrees in the computation for tracking the three-dimensional orientations of the vehicle.

* * * * *